US012650888B1

(12) United States Patent (10) Patent No.: US 12,650,888 B1
Dubitski Kopitchinski et al. (45) Date of Patent: Jun. 9, 2026

(54) SYSTEMS AND METHODS FOR ON-DEMAND MPI CLUSTER

(71) Applicant: Domino Data Lab, Inc., San Francisco, CA (US)

(72) Inventors: Kate Dubitski Kopitchinski, Hoboken, NJ (US); Joshua Broomberg, New York, NY (US); Kevin Flansburg, Atlanta, GA (US); Andrey Petrov, Naperville, IL (US); Jan-Felix Desroches, Los Angeles, CA (US); Sean Westbrook, San Francisco, CA (US); Georgi Matev, San Francisco, CA (US); Po Cheung, Fremont, CA (US); Andrea Lowe, Oakland, CA (US); Alexander Polovinko, San Jose, CA (US)

(73) Assignee: Domino Data Lab, Inc., San Francisco, CA (US)

( * ) Notice: Subject to any disclaimer, the term of this patent is extended or adjusted under 35 U.S.C. 154(b) by 478 days.

(21) Appl. No.: 18/190,429

(22) Filed: Mar. 27, 2023

Related U.S. Application Data

(60) Provisional application No. 63/325,415, filed on Mar. 30, 2022.

(51) Int. Cl.
 *G06F 9/54* (2006.01)
 *G06F 9/451* (2018.01)
 *G06F 16/11* (2019.01)
(52) U.S. Cl.
 CPC .............. *G06F 9/546* (2013.01); *G06F 9/451* (2018.02); *G06F 16/122* (2019.01)

(58) Field of Classification Search
 CPC ......... G06F 9/546; G06F 9/451; G06F 16/122
 USPC ........................................................ 719/313
 See application file for complete search history.

(56) References Cited

U.S. PATENT DOCUMENTS

| | | | | |
|---|---|---|---|---|
| 2002/0124205 A1* | 9/2002 | Grey | ................... | G06F 11/3688 |
| | | | | 714/33 |
| 2002/0174139 A1* | 11/2002 | Midgley | ............. | G06F 11/2071 |
| 2003/0214525 A1* | 11/2003 | Esfahany | ............. | G06F 9/5061 |
| | | | | 715/700 |
| 2005/0080801 A1* | 4/2005 | Kothandaraman | ..... | H04L 67/02 |
| 2006/0204211 A1* | 9/2006 | Morohoshi | .......... | H04N 21/482 |
| | | | | 386/265 |
| 2006/0211404 A1* | 9/2006 | Cromp | ................ | H04L 67/1095 |
| | | | | 250/559.48 |

(Continued)

OTHER PUBLICATIONS

Co-pending U.S. Appl. No. 16/194,204, inventors Elprin; Nicholas et al., filed Nov. 16, 2018.

*Primary Examiner* — Tuan C Dao
(74) *Attorney, Agent, or Firm* — WILSON SONSINI GOODRICH & ROSATI

(57) ABSTRACT

Systems and methods are provided for providing an on-demand distributed computing cluster. The system comprises: a memory for storing a set of software instructions, and (ii) one or more processors configured to execute the set of software instructions to: (a) track one or more computing environments at one or more time points by a version controlled file system; (b) reproduce one or more components of a tracked environment for an execution; and (c) receive, via a graphical user interface (GUI), a user input to synchronize the one or more components across a plurality of nodes in a distributed computing cluster.

20 Claims, 5 Drawing Sheets

(56) References Cited

U.S. PATENT DOCUMENTS

| | | | | |
|---|---|---|---|---|
| 2006/0212487 A1* | 9/2006 | Kennis | G06Q 40/00 | |
| 2006/0259524 A1* | 11/2006 | Horton | G06F 16/00 | |
| 2007/0101069 A1* | 5/2007 | Corbett | G06F 12/0866 | |
| | | | | 711/E12.019 |
| 2008/0091746 A1* | 4/2008 | Hatasaki | G06F 11/2033 | |
| 2010/0088317 A1* | 4/2010 | Bone | G06F 16/134 | |
| | | | | 709/219 |
| 2010/0313063 A1* | 12/2010 | Venkataraja | G06F 9/5022 | |
| | | | | 714/1 |
| 2010/0333092 A1* | 12/2010 | Stefansson | G06F 9/44505 | |
| | | | | 718/100 |
| 2012/0297363 A1* | 11/2012 | Perisic | G06F 8/71 | |
| | | | | 717/122 |
| 2016/0037549 A1* | 2/2016 | Seo | H04W 76/14 | |
| | | | | 370/329 |
| 2016/0087915 A1* | 3/2016 | Marr | H04L 41/145 | |
| | | | | 709/226 |
| 2018/0004831 A1* | 1/2018 | Smith | G06F 16/176 | |
| 2019/0243682 A1* | 8/2019 | Botelho | G06F 21/44 | |
| 2020/0068010 A1* | 2/2020 | Xing | G06F 16/2228 | |
| 2021/0012310 A1* | 1/2021 | Oliveira | G06Q 20/1085 | |
| 2022/0262405 A1* | 8/2022 | Conlin | G06Q 10/06 | |
| 2022/0263877 A1* | 8/2022 | Conlin | G06N 20/00 | |

* cited by examiner

SYSTEMS AND METHODS FOR ON-DEMAND MPI CLUSTER

CROSS-REFERENCE

This application claims the benefit of U.S. Provisional Application No. 63/325,415, filed Mar. 30, 2022, which application is incorporated herein by reference in its entirety.

BACKGROUND

MPI (Message Passing Interface) is an open-source framework for distributed computing. Files being used in distributed jobs have to be present on all worker nodes. Worker nodes within a cluster run containerized applications and handle networking to ensure that traffic between applications across the cluster and from outside of the cluster can be properly facilitated. The worker nodes perform any actions triggered via the API (application programming interface) running on the master node. A major difference between MPI and other cluster types is the lack of a scheduler node or resource manager. Traditionally, one approach a user can take to share/distribute files is using a networked file system (NFS) that is shared across all nodes. However, traditional NFS may not be suited for interactive workloads. For example, a NFS may not be suited for version control due to many small files rendering the version controlled code not feasible. Additionally, when interactively developing for MPI on NFS, it is easy to mutate the code whilst a job is running, which can cause errors.

Another approach is to manually synchronize files from client to worker node just before starting a job. For example, a user may use a tool such as Secure Copy (SCP) (using SecureShell (SSH) to copy only the files or directories) or Remote Sync (Rsync) to transfer files from/to a remote server. However, rsync and scp can be cumbersome to use prior to each run resulting in MPI jobs being "batch jobs" without the interactive capability.

SUMMARY

Recognized herein is a need for improving the development experience for distributed MPI (Message Passing Interface) jobs. Systems and methods herein may improve the development experience of interactively developing distributed MPI jobs. In particular, systems and methods herein allow for using MPI from interactive Workspaces to synchronize files being used in distributed jobs. An easy-to-use user interface may be provided allowing for synchronizing (sync) files from Workspace to workers (worker nodes) with a simple click (e.g., a click on a graphical element such as button). For example, users may trigger a new sync when ready before each run via the user interface by simply using the button.

MPI (Message Passing Interface) is an open-source framework for distributed computing. MPI is a library for creating distributed applications. MPI is a standardized and portable message-passing standard designed to function on parallel computing architectures. The MPI standard defines the syntax and semantics of library routines that are useful to a wide range of users writing portable message-passing programs. However, unlike other types of clusters, an MPI cluster lacks a scheduler node or resource manage which queues and coordinates tasks. Systems and methods herein provide an artifacts reconstruction system that tracks code and artifacts in Workspaces. This beneficially allows for file synchronization by reproducing a snapshot of the code and artifacts on the worker nodes with identical file paths (e.g., using open source rsync). After the sync has occurred, a user may make changes and interact with the files in their Workspace without disturbing the cluster files during a run. Users may trigger a new sync when ready before each run using the button.

In an aspect, a system for providing an on-demand distributed computing cluster is disclosed. The system comprises i) a memory for storing a set of software instructions, and (ii) one or more processors configured to execute the set of software instructions to: (a) track one or more computing environments at one or more time points by a version controlled file system; (b) reproduce one or more components of a tracked environment for an execution to be run on the on-demand distributed computing cluster; and (c) receive, via a graphical user interface (GUI), a single user input indicative of a synch instruction thereby triggering a synchronization of the one or more components across a plurality of worker nodes in the on-demand distributed computing cluster.

In a related yet separate aspect, a computer-implemented method for providing an on-demand distributed computing cluster is disclosed. The method comprises: (a) tracking one or more computing environments at one or more time points by a version controlled file system; (b) reproducing one or more components of a tracked environment for an execution to be run on the on-demand distributed computing cluster; and (c) receive, via a graphical user interface (GUI), a single user input indicative of a synch instruction thereby triggering a synchronization of the one or more components across a plurality of worker nodes in the on-demand distributed computing cluster.

In some embodiments, the distributed computing cluster is a Message Passing Interface (MPI) cluster without a scheduling node. In some embodiments, the GUI allows the user to interact with the one or more components during the execution running on the on-demand distributed computing cluster. In some embodiments, the single user input includes a click on a graphical element displayed on the GUI. In some embodiments, the GUI is configured to display an indicator indicating a readiness status of the on-demand distributed computing cluster. In some cases, an execution run command is received via the GUI when the status of the demand distributed computing cluster is not ready. In some cases, the readiness status is determined by a distributed computer operator based on a number of available worker nodes. In some embodiments, the GUI is configured to display information related to a last synchronization.

In some embodiments, the one or more components comprise data and codes. In some cases, the synchronization comprises updating the data and codes on the plurality of worker nodes according to a change of the data and codes tracked by the version-controlled file system.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
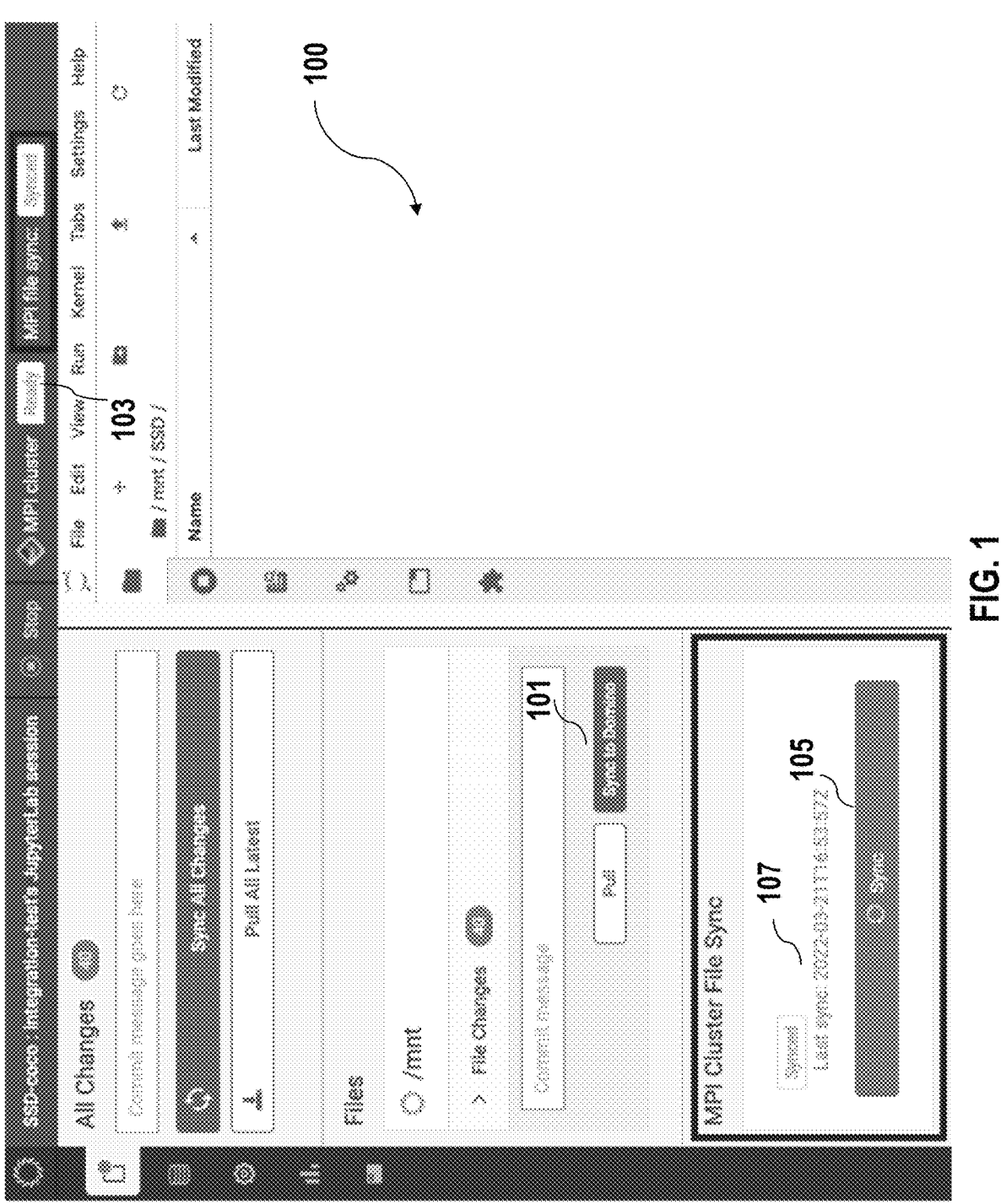
FIG. 1 shows an example of a graphical user interface (GUI) for file syncing in an MPI cluster, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides systems and methods that improve the development experience of interactively developing distributed MPI jobs. Systems and methods herein allow using MPI from interactive Workspaces to synchronize files being used in distributed jobs. An easy-to-use user interface may be provided allowing for synchronizing (sync) files from Workspace to workers (worker nodes) with a simple click on a button. For example, users may trigger a new sync when ready before each run using the button.

The term "job" as utilized herein may refer to a type of execution where an executor machine is assigned to execute a specified command in its OS shell. A Job may keep a snapshot of all the files, including any results the code creates or modifies. This includes charts, tables, data files, and serialized model data. All assets are versioned and can be compared across different Jobs. When a Job is started, the platform may launch a new environment for the code on the target executor. Each job may get its own container environment. The term "execution" may refer to code execution tasks assigned to an executor. For instance, an execution may include jobs, workspace sessions, and web apps.

User may use Jobs to run Python, R, or Bash scripts from a project. As described later herein, the platform herein may organizes work in Projects. A project may include, for example, the code, environment settings, data and input/output artifacts.

MPI (Message Passing Interface) is an open-source framework for distributed computing. MPI is a library for creating distributed applications. MPI is a standardized and portable message-passing standard designed to function on parallel computing architectures. The MPI standard defines the syntax and semantics of library routines that are useful to a wide range of users writing portable message-passing programs. However, unlike other types of clusters, an MPI cluster lacks a scheduler node or resource manage which queues and coordinates tasks. The platform herein comprises an artifacts reconstruction system that tracks code and artifacts in Workspaces. This beneficially allows for file synchronization by reproducing a snapshot of the code and artifacts on the workers with identical file paths (e.g., using open source rsync). After the sync has occurred, a user may make changes and interact with the files in their Workspace without disturbing the cluster files during a run. Users may trigger a new sync when ready before each run using the button.

The platform herein may provide workspace which is an interactive session where a user can conduct research, analyze data, train models, and the like. Workspaces may be used to work in the development environment such as Jupyter notebooks, RStudio, VS Code, and many other customizable environments. A user may create a workspace so the user can use preferred tools in a reproducible and customizable environment.

As utilized herein, terms "component," "system," "interface" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers. Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal). As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

A container is a form of operating system virtualization. For instance, a container can be a standard unit of software that packages up code and the dependencies so the application runs quickly and reliably from one computing environment to another. A single container can be used to run from a small microservice or software process to a larger application. A container may include all the necessary executables, binary code, libraries, and configuration files. A Docker container is a running instantiation of an image, essentially a working version of an image. In an example, a user may create or deploy a new container or application using a Docker. In some cases, to deploy a simple application using Docker, a user may create a directory and, inside the directory, create a Dockerfile. In the Dockerfile, the user may describe what they want to include in the container that they would like to run. The user may then run a "docker-build" command, which will examine the directory specified and the Dockerfile contained therein and build a Docker image. The user may then run a "docker run" command, which will create a Docker container that can run anything that has been specified in the Dockerfile. The aforementioned Docker images are essentially blueprints and can be considered as models that describe what a Docker container should look like, at least when the container is first started.

Methods and systems herein may improve file syncing in an MPI cluster. In some embodiments, systems herein may allow for seamless integration of MPI Cluster type to distributed computer operator (DCO) which launches a StatefulSet of MPI worker nodes. The system may provide functionality to generate necessary configuration for MPI in the Run Pod to connect to workers, MPI-specific logic to wait for cluster availability before starting a Run and functionality for syncing project files to worker nodes prior to initiating a MPI job within a run (workspace).

Figure 4:
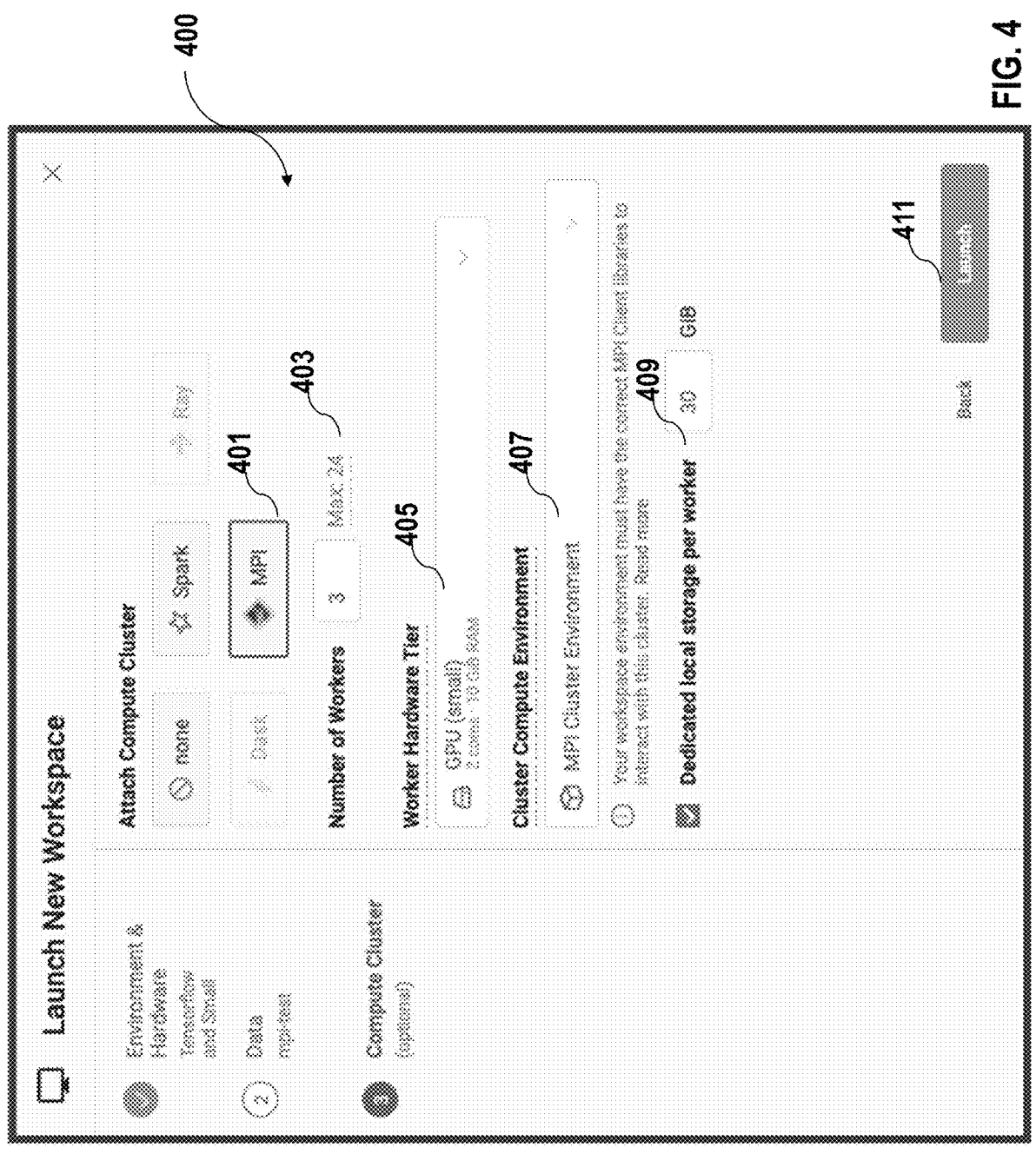
FIG. 4 shows an example of a GUI for creating an on-demand MPI cluster attached to a Workspace.

Systems and platform herein may implement the MPI support by allowing users to be able to attach an ephemeral, single-tenant cluster to Jobs, Scheduled Jobs, or to use interactively in Workspaces. The platform may allow users to create an on-demand MPI cluster by attaching to a workspace, and/or attached to a job. FIG. 4 shows an example of a GUI 400 for creating an on-demand MPI cluster attached to a Workspace. As shown in the example, a user may launch a new workspace and select the compute cluster. A user may attach MPI 401 as the compute cluster to the workspace. The GUI may allow the user to set up cluster configuration attributes such as number of workers 403 (e.g., number of MPI node workers making up the cluster when it starts, the combined capacity of the workers is available for the workloads), the worker hardware tier 405 which indicate the amount of compute resources (CPU, GPU, and memory) made available to each MPI node worker, the cluster compute environment 407 which specifies the compute environment for the MPI cluster and the dedicated local storage per executor 409 which defines the amount of dedicated storage in Gigabytes (2^30 bytes) available to each MPI worker. The storage is automatically mounted to/tmp. The storage is automatically provisioned when the cluster is created and de-provisioned when it is shut down. In such cases, the on-demand MPI clusters may be temporary. For instance, any data stored on cluster local storage, and not externally, may be lost when the workload and the cluster shut down.

After the workspace is launched (e.g., a user clicking on the "launch"), the user may access the configured MPI cluster. The status of the MPI cluster (e.g., ready status in FIG. 1) may be displayed to a user as the cluster worker nodes can take time to spin up than the workspace.

Figure 5:
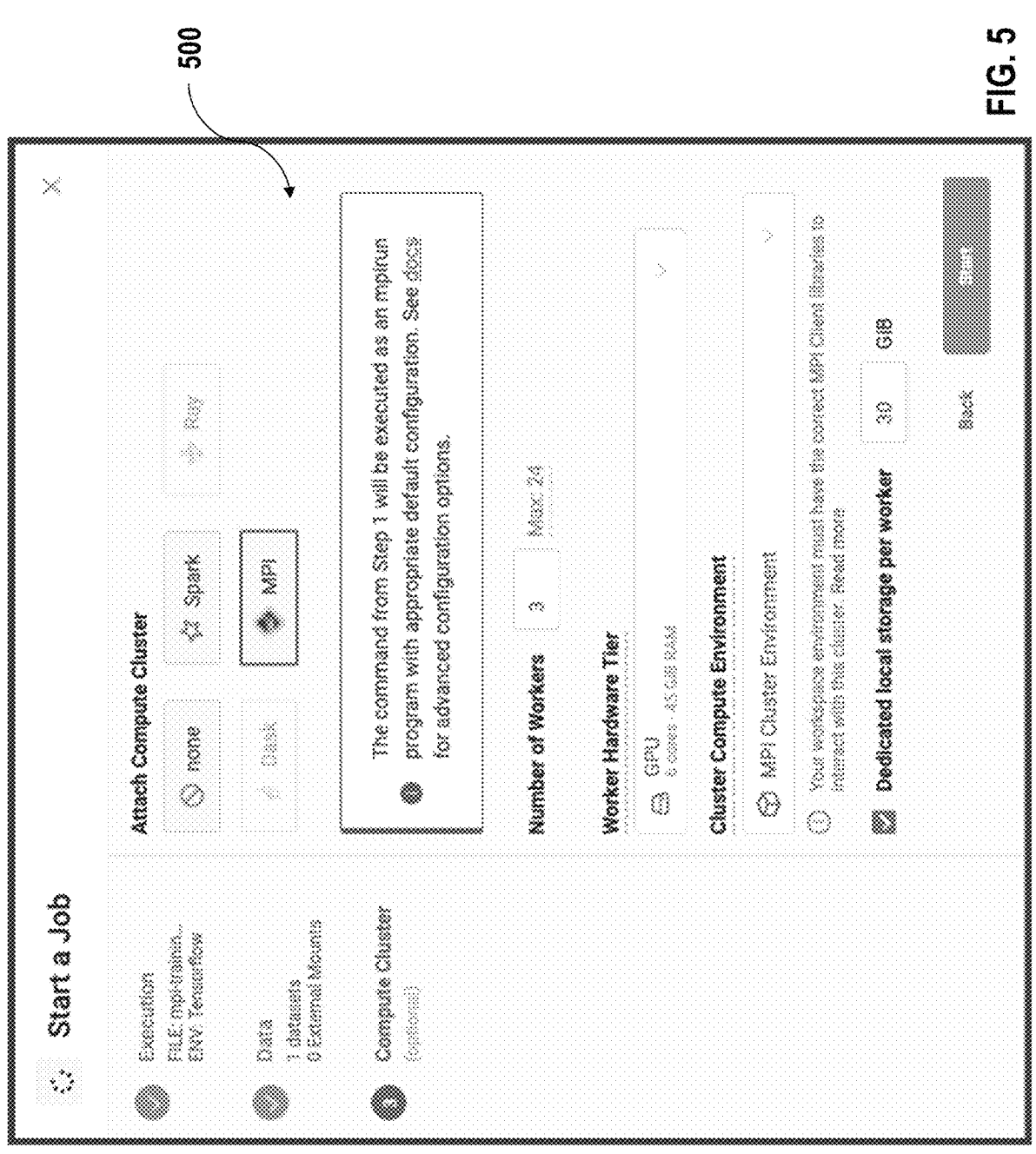
FIG. 5 shows an example of a GUI for creating an on-demand MPI cluster attached to a Job.

FIG. 5 shows an example of a GUI 500 for creating an on-demand MPI cluster attached to a Job. As shown in the example, a user may start a job and select the compute cluster. Similarly, the user may set up cluster configuration attributes for the MPI cluster. Once the user completes the cluster settings, the job may be launched. For example, the job start command may be wrapped in a mpirun prefix. Similarly, when the workspace or job starts, an on-demand MPI cluster is automatically provisioned with the MPI cluster settings. The cluster is attached to the workspace or job when the cluster becomes available and when the workspace or job shut down the on-demand MPI cluster and all associated resources may be automatically stopped and de-provisioned. This may include any compute resources and storage allocated for the cluster.

The Environments may be able to be marked as usable for MPI worker nodes. On launch, a cluster management software (e.g., Nucleus) may create a resource (e.g., MPICluster Kubernetes CustomResource) defined as part of the project, which the Distributed Compute Operator (DCO) may use to launch an appropriately configured cluster. When the Run completes, the system may mark the resource for deletion, and the DCO may clean up the associated cluster resources.

As described above, the cluster may consist primarily of a StatefulSet of worker Pods behind a "headless" Service to allow for node discovery. Currently, Open MPI may not provide the scheduling functionality and the cluster may not include "master" or "head" Pod. Worker Pods may start with sshd as the entrypoint command.

In some cases, the MPI jobs may be launched by invoking a program e.g., mpirun on a client node. This program then connects to worker nodes via SSH to launch worker processes. Cluster and task configuration may be specified using arguments to the program (e.g., mpirun). The platform herein may dynamically provision and orchestrate an MPI cluster directly on the infrastructure backing the platform's current deployment. In some embodiments, this program may be invoked from the Run Pod (Workspace, Job) provided by the platform herein. For instance, a user may start a new workspace for interactive work or job for batch processing, the platform's orchestration system may create, manage, and make available a containerized MPI cluster to the execution. The on-demand MPI cluster as provided by the platform herein may be used for a variety of workloads such as distributed multi-GPU training, high performance computing and various others.

This program may be configured primarily by a cluster management software (e.g., Nucleus) when it generates the execution Pod Spec (via file mounts and/or environment variables). Nucleus may supply parameters using a configuration file or environment variables so that the user can simply invoke mpirun with minimal arguments. In the case of Jobs, the start job command may be wrapped in an mpirun prefix automatically and the user may have the option to supply parameter overrides. A user may be able to override this configuration by supplying arguments. This configuration may include sane defaults for network protocol configuration (which may depend on the network infrastructure being used), the number of processes to use (based on cluster size), logging configuration, etc.

The MPI feature may require an explicit specification of worker hostnames in a "hosts" file (not to be confused with/etc/hosts). Nucleus may generate the file based on the predictable hostnames of Pods within a StatefulSet and behind a headless Service, i.e. mpi-$EXECUTION_ID-mpi-worker-$N.mpi-$EXECUTION_ID-mpi-worker.domino-compute.svc.cluster.local, with entries based on the N number of workers configured for the Run.

Existing clusters are determined to be ready based on the scheduler service pod being in the ready state. This is not possible for MPI, so the DCO may be responsible for marking a cluster (the custom resource) as "Ready" when all worker Pods become ready. For example, MPI applications typically expect a specific number of workers so the cluster may be only ready when the specific number of workers are available. The platform herein may provide Workspaces whose execution may not block waiting for the cluster to become ready, while the cluster status (existing behavior) may be made available to the user. For instance, the workspace may be usable before the cluster is ready and a user may be reminded that a task has not yet submitted (e.g., a graphical status badge indicating that tasks cannot yet be submitted). For Jobs, when the execution blocks and waits for the cluster to become ready (when the MPI not handles a missing node gracefully) a "ready" status may be provided to a user (e.g., MPI cluster Ready 103 in FIG. 3).

File Syncing

Existing MPI may not have the capability of serializing code and distributing it to workers. Current MPI may rely on code to be made available at identical paths on all nodes. In the case of Jobs, even it is possible to sync Project code to each node prior to running the task, the interactive Workspaces may still require a solution to sync code before each invocation of mpirun, and prevent syncing during execution.

The system and/or platform herein may provide a unique frontend features (GUI) for supporting on-demand MPI clusters enabling users to work with MPI clusters using a versioned workspace, Jobs, and Scheduled Jobs provided by the platform herein. Users may manually trigger a sync process within the GUI prior to invoking mpirun to sync Project code (i.e. DFS, GBP, mounted repositories) to cluster workers (using rsync invoked by the executor). Such new MPI features may also be added to any APIs related to creating Environments, Workspaces, Scheduled Jobs, and Jobs. Such features beneficially improve the existing MPI workflows (often requires manually scping files), and allow for an interactive development process.

Systems and methods herein may change the logic for provisioning runs. In some cases, the system may generate MPI configuration and add to exec pod spec. Systems herein may provide an improved abstraction layer such that the interface may be independent across modules. For example, systems herein may shift the cluster status calculation out of Nucleus and into the DCO via the custom resource status field thereby improving the abstraction layer.

FIG. 1 shows an example of a graphical user interface (GUI) 100 for file syncing in an MPI cluster, in accordance with some embodiments of the present disclosure. In some embodiments, the platform may not provide a standalone GUI for displaying MPI cluster status. Instead, the MPI cluster status may be viewed or set up through a Workspace GUI or Job GUI. When a user interacts with an on-demand MPI cluster, data and code from the Workspace may need to be synced with the worker nodes before submitting the program invoking the MPI jobs e.g., an mpirun execution. The GUI as illustrated in FIG. 1 may allow users to easily sync files or all changes via a navigation bar of the workspace. For example, the sync all changes button or "sync to Domino" 101 may be used for saving all changes or files (e.g., changes to files in the/mnt directory of the workspace) to the platform's version controlled file system. In some embodiments, the same navigation bar may also allow a user to synch data and code from the workspace with the worker nodes in the MPI cluster. For example, a user may open the 'File Changes' tab on the navigation bar of a Workspace GUI and select/click on 'Sync' 105 under 'MPI Cluster File Sync'. A user may also perform manually sync when they desire to update the code on the cluster worker nodes (e.g., synching codes from the Workspace to the worker nodes).

The GUI may also display changes since the last sync operation (e.g., last synch time 107). In some embodiments, the mpirun command may not automatically detect changes since the last sync, a user's manual "synch" command may trigger the system to use updated code on the cluster worker nodes. In some cases, a user may not be able to execute mpirun commands while filles are syncing.

In some cases, upon a user clicking on the "synch" graphical element 105 displayed within the GUI, the MPI file sync may be automatically applied to the following directories:

/mnt and subdirectories including/imported for the file system projects

/mnt/code, /mnt/artifacts, /mnt/imported and subdirectories for git-based projects /repos When a user creates an MPI cluster attached to a workspace or job of the platform, any dataset accessible from the workspace or job may also be accessible from all components of the cluster under the same dataset mount path. Worker nodes may also be able to write to attached read/write datasets.

Systems herein may also be compatible with existing credential features. For example, when AWS Credential Propagation is enabled for the deployment, temporary AWS credentials corresponding to the roles enabled for a user in a company identity provider may be automatically available on all MPI workers and the execution. In some cases, the credentials may be automatically refreshed and available under a profile name corresponding to each role in an AWS credential file. The location of the file is stored in the AWS_SHARED_CREDENTIALS FILE environment variable which puts in the proper search path for s3fs and boto3.

As described above, the MPI features herein may allow users to interact with Workspace, datasets, jobs provided by the platform. The platform may provide an artifacts reconstruction system that may enable one or more users to reconstruct an environment. The reconstructed environment may accurately reflect the environment captured at a given time point. Methods and systems of the invention will be described with reference to embodiments where container-based virtualization (containers and Docker) is used. However, it is to be understood that the container and Docker (or other container orchestrator/management tool for automating deployment, scaling, and management of containerized applications) system is only an example mechanism, without suggesting any limitation as to the scope of the invention. Various other container technologies or systems such as Java containers, Unikernels, Linux Container (LXC), Rocket containers, Windows server containers, or Hyper-V containers can also be used in the system. In alternative embodiments, the methods and systems can be applied to any operating-system-level virtualization or machine level virtualization (e.g., virtual machine and hypervisor).

In some embodiments, the file system or artifacts reconstruction system of the platform may comprise application Program Interfaces (API) configured to register a model with the system, associate that model with a particular training dataset, automatically map the underlying features, register ongoing inferences by the model against the training dataset to understand deviations from the training data set, register a prediction result, register model quality metrics (e.g. contrast scores), register underperforming cohorts, register parameters for triggering a report, register notification channels and various other functionalities. The APIs can be any suitable API gateway that may allow developers to encapsulate the internal structure of an application in multiple ways, depending upon use case. This is because, in addition to accommodating direct requests, gateways can be used to invoke multiple back-end services and aggregate the results. For example, the APIs may invoke feature distribution computation on virtual machines or containerized applications (e.g., Apache Spark).

The automated computing environment management system of the platform may automatically track changes to code, data, tools, and packages through continual version control. These are captured in Workspaces that allow data scientists to instantly roll back to or recreate the exact experiment environment used to create a model. This streamlines audit, governance, compliance, and regulatory reporting. The computing environment management system can be the same as those described in U.S. application. Ser. No. 16/194,204 entitled "systems and methods for automated computing environment management" which is incorporated herein by reference in its entirety.

Figure 2:
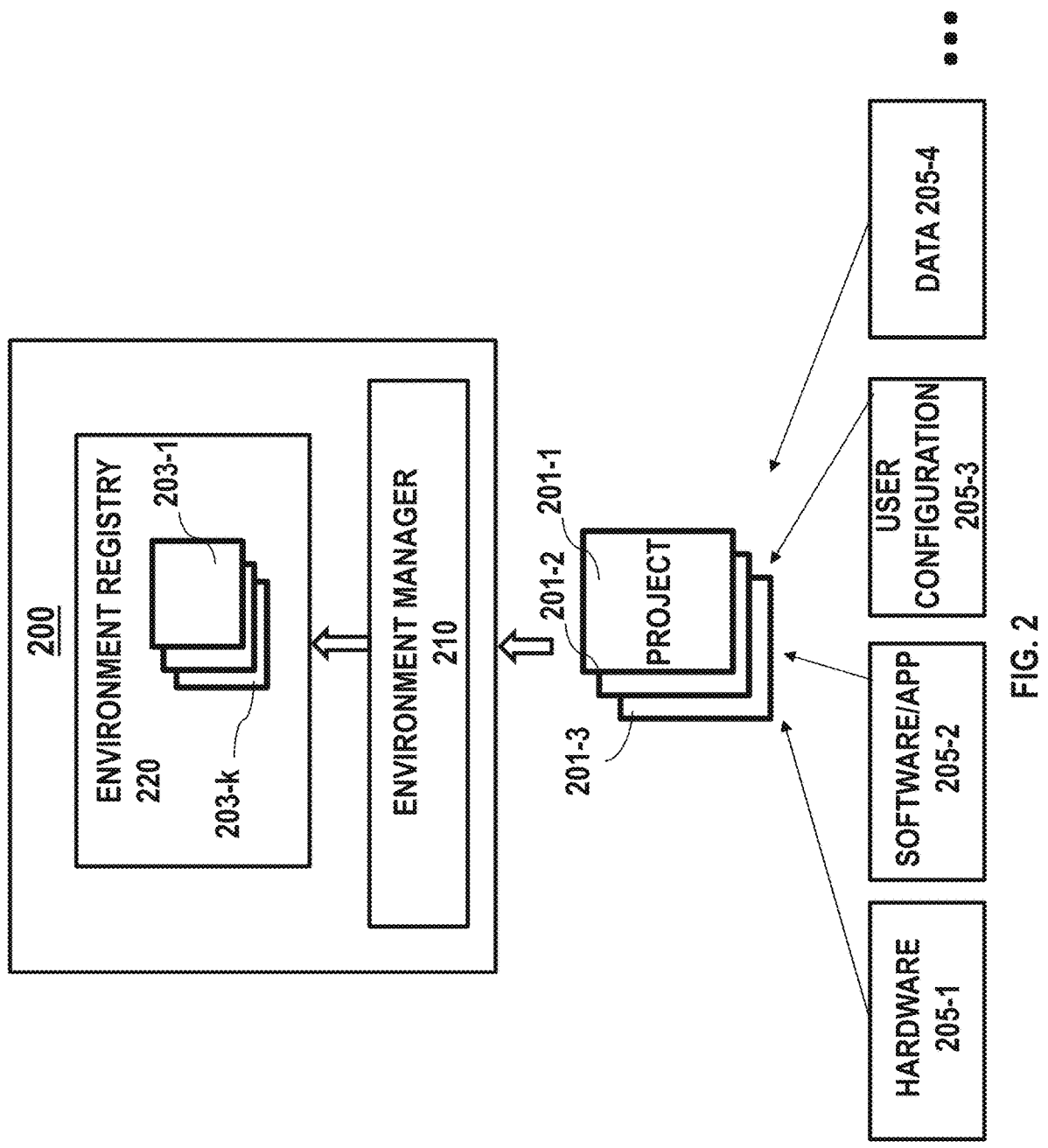
FIG. 2 schematically shows an automated computing environment management system, in accordance with some embodiments of the invention.

FIG. 2 schematically shows an automated computing environment management system 200, in accordance with some embodiments of the invention. The automated computing environment management system may also refer to as the artifacts reconstruction system, which can be interchangeably used throughout the specification. The automated computing environment management system may comprise an environment registry 220 managed by an environment manager (or environment manager) 210. In some embodiments, the environment registry 220 may comprise a database. The environment registry 220 may comprise a plurality of environments 203-1, 203-2, . . . , 203-$k$ captured at different time points. One or more users in a collaborative environment may be allowed to reconstruct an environment to be the same environment selected from the plurality of stored environments captured at a given time point. For example, one or more users may be allowed to reconstruct an environment to be the same environment captured at a user selected time point, user selected phase (e.g., beginning of analytical process, productionalization or deployment) and the like. In some cases, the reconstructed environment is 100% same as the selected environment. Alternatively or additionally, the reconstructed environment can be at least 50%, 60%, 70%, 80%, 90% the same as the selected environment. In some cases, the percentage of reconstruction may be defined by a user.

In some embodiments, a user of the automated computing environment management system may not need to perform any additional work to create the fully reproducible environments. The automated computing environment management system may build the environments, catalogs the environments, and create linkages between the environments and/or components of the environments in a fully automated fashion, such that operation is seamless to the user. In some embodiments, each of the environments may contain a workflow (or recipe) specifying how the environment is built, a log of how the build process took place (e.g., through a series of algorithms or steps), a set of linkages between components (either within an environment or across different environments) which were used (e.g., as "ingredients" or inputs to the workflow), and a final build image.

A plurality of projects 201-1, 201-2, and 201-3 may be created in a computing system. In some instances, the computing system may be a cloud computing system. Each of the plurality of projects may comprise one or more elements that may be changed, created, optimized along with time. The one or more elements may be various different aspects of a project. In some embodiments, the one or more elements may comprise hardware components 295-1. Examples of hardware components may include, but not limited to, mainframes, systems and servers, storage devise, networks, network components and the like. The one or more elements may comprise software or application components 205-2. Examples of software components may include, but not limited to, network application server software, data software and the like. In some cases, the one or more elements may comprise data 205-4 (e.g., input datasets) used or processed in a project. In some cases, the one or more elements may comprise, for example, applications, software, fundamental computing resources, environment (e.g, application-hosting environment), networks, storages, and the like. For example, one or more of the service provider's applications running on the cloud infrastructure may be accessed or configured by a user; one or more of user-created or acquired applications that are created using programming languages, libraries, services, and tools supported by the service provider may be deployed onto the cloud infrastructure; one or more operating systems, applications, arbitrary software, processing, storage, networks, and other fundamental computing resources may be provisioned by a user, deployed and run on the cloud infrastructure; applications and configuration settings for the application-hosting environment may be controlled and configured by a user. The one or more elements may comprise various other factors such as information related abstraction layer (e.g., virtual servers, virtual storage, virtual networks, virtual private networks, virtual applications and operating systems, virtual clients) or information related to resource provisioning such as dynamic procurement of computing resources and other resources that are utilized to perform tasks within the cloud computing systems. The one or more elements may comprise user configuration 205-3 that has been previously executed by a user, data scientist, or team member within an organization.

In some cases, an environment may be associated with an image. In some embodiments, an image may be built up from a series of layers. Each layer may represent an instruction in the image's Dockerfile. Each layer may be a set of differences from the layer before it. The layers are stacked on top of each other. When creating a new container, a new writable layer may be added on top of the underlying layers ("container layer"). All changes made to the running container, such as writing new files, modifying existing files, and deleting files, may be written to this thin writable container layer. An environment may comprise information related to the relevant changes made to the previous image which can be used to form another image. An environment may comprise other information such as data used in a project which will be described later herein.

For example, prior to using the on-demand MPI cluster, a user may set up a base image as a base cluster environment for the on-demand MPI cluster. For instance, a user may set up one environment for the on-demand MPI cluster (cluster compute environment) and one environment for the workspace/job execution (compute environment). A user may start from a custom base image (e.g., entering an image URI for a deployable MPI image) or from a pre-built image to set up a base image. To create an MPI-enabled compute environment, a user may modify an environment to add additional packages or a specific package version. As described elsewhere herein, connections or linkages provided by the reproducible environment may beneficially create flexibility in managing dependencies for individual projects or workloads without shared cluster worker complexities. For example, to add a new cluster worker, a user may only need to add the appropriate statements in the Docker Instructions section of both the MPI cluster and Open MPI execution environments.

As shown in FIG. 2, a plurality of projects 201-1, 201-2, and 201-3 may each be associated with a Docker image. A Docker image is a read-only template. For example, an image could contain an Ubuntu operating system with Apache and a web application installed. Images are used to create Docker containers. Docker provides a simple way to build new images, and Docker images that other people have already created can be downloaded. Docker images are the build component of a Docker. These Docker images may be held by a Docker registry. These are public or private stores from which images can be uploaded or downloaded. A public Docker registry is called a Docker Hub that provides access to a large collection of existing images. Docker registries are the distribution component of Docker. Docker containers are similar to a directory. Various other application registries such as Kubernetes Application Registry may be used to provide storage, discovery, and management of complete applications. Docker container holds everything that is needed for an application to run. Each container is created from a Docker image. Docker containers can be run, started, stopped, moved, and deleted. The Docker image can be modified by one or more users.

In some cases, the plurality of projects 201-1, 201-2, and 201-3 may correspond to the plurality of Docker images. The plurality of projects may be created and modified by one or more users over time. The plurality of projects may be used to deploy a container or configure a container environment.

The environment manager 210 may build the environments, catalog the environments, and create linkages between the environments and/or components of the environments in a fully automated fashion, such that operation is seamless to the user. In some embodiments, the environment manager 210 may be configured to provide a cryptographic guarantee on the creation of an environment (e.g., guaranteeing that the created environment meets one or more high-level security properties). The environment manager 210 may generate a globally unique identifier uniquely associated with each environment. The environment manager 210 may then store an environment in an environment registry 220.

The environment manager 210 can be implemented in hardware components (e.g., ASICs, special purpose computers, or general purpose computers), software or combinations of hardware and software. In some embodiments, the environment manager may comprise one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. In some cases, the environment manager 210 is a component of the docker system. Alternatively, the environment manager or at least a portion of the environment manager is a separate component external to the docker system.

The environment registry 220 may be configured to trace changes of environment. A plurality of environments 203-1, 203-2, . . . , 203-k may be managed and stored in the environment registry 220. The plurality of environments 203-1, 203-2, . . . , 203-k can be retrieved and accessed by the environment manager. For instance, an environment may be retrieved by a unique identifier of the environment. A plurality of components of an environment may be retrieved by the environment manager. Components of an environment may comprise the one or more elements of the associated project as described above along with additional information such as results, discussion, and delivered artifacts captured by the system as they happen. The one or more components (e.g., data set, code, API, model, script, tools, etc) of the environment may be retrieved by a version uniquely associated with each of the one or more components. The sequence or number of environments need not be uniquely associated with the plurality of projects. An environment may be uploaded to the environment registry at predetermined time point regardless of a change. An environment may be uploaded to the environment registry upon a change of the environment being made (e.g., when an environment is created or when one or more components of an environment are created or updated).

Figure 3:
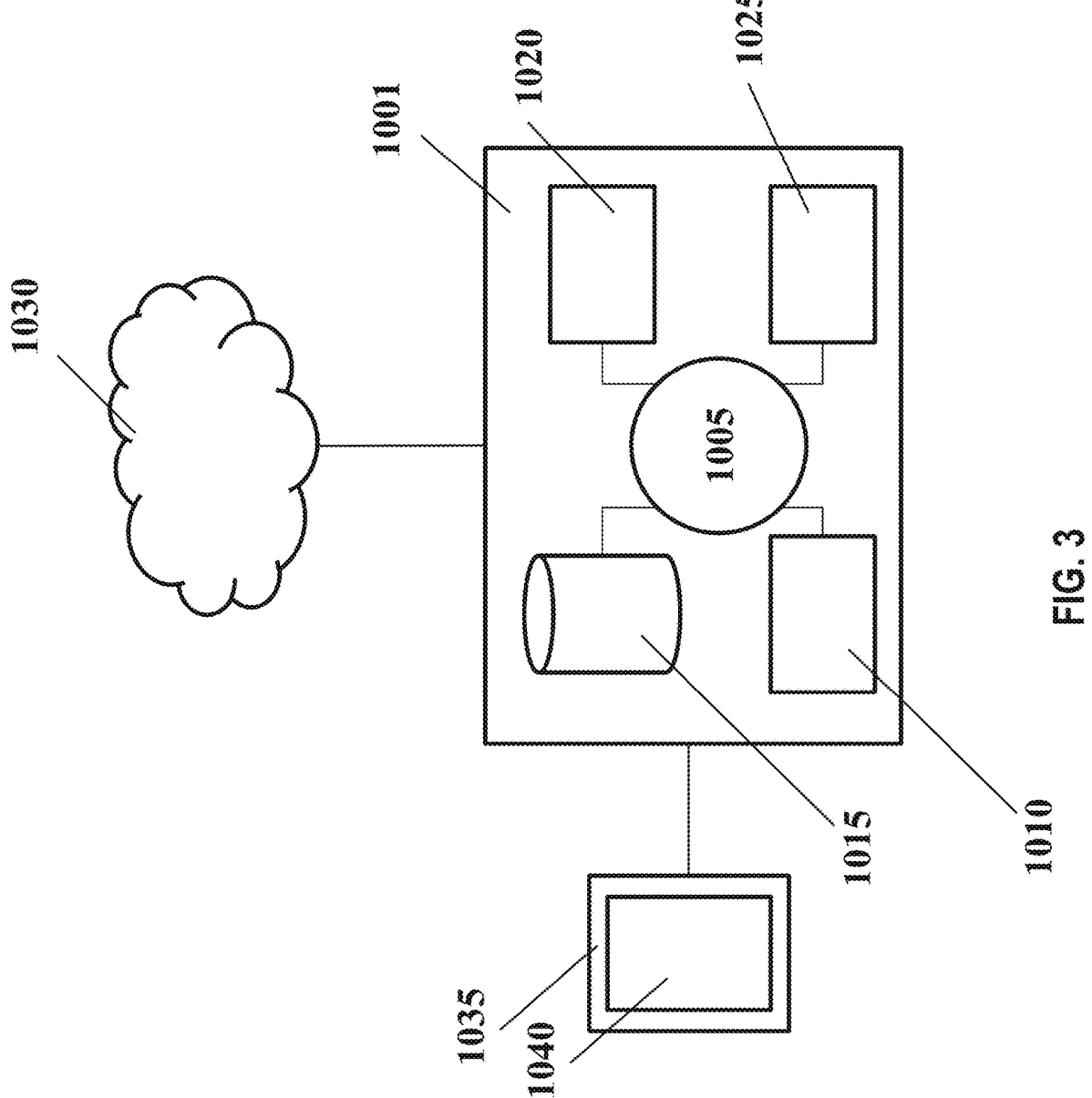
FIG. 3 shows a computer system that is programmed or otherwise configured to implement a system for supporting file sync in MPI clusters as described above.

FIG. 3 shows a computer system 1001 that is programmed or otherwise configured to implement a system for file sync in MPI clusters as described above. The computer system 1001 can regulate various aspects of the present disclosure, such as, for example, implementing various components of the file system, the MPI support features, rendering graphical user interfaces and the other functions as described elsewhere herein. The computer system 1001 can be an electronic device of a user or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet.

The network 1030 in some cases is a telecommunication and/or data network. The network 1030 can include one or more computer servers, which can enable distributed computing, such as cloud computing. For example, one or more computer servers may enable cloud computing over the network 1030 ("the cloud") to perform various aspects of analysis, calculation, and generation of the present disclosure, such as, for example, capturing a configuration of one or more experimental environments; performing usage analyses of products (e.g., applications); and providing outputs of statistics of projects. Such cloud computing may be provided by cloud computing platforms such as, for example, Amazon Web Services (AWS), Microsoft Azure, Google Cloud Platform, and IBM cloud. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1015 for ready access by the processor 1005. In some situations, the electronic storage unit 1015 can be precluded, and machine-executable instructions are stored on memory 1010.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a model monitor server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, the various components (e.g., lab, launch pad, control center, knowledge center, etc) of the model monitor system. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005. The algorithm can, for example, capture a configuration of one or more experimental environments; generate user defined reports of hardware usage; monitor models; and generate usage statistics of selected projects or models.

It should be noted that application of the provided methods and systems are not limited by the underlying computing infrastructure or computing environment. For instance, the provided model monitor system may be applied to grid computing platform or systems utilizing various technologies such as mesh computing, peer-to-peer computing, autonomic (self-healing) computing, wireless sensor networks, mobile data acquisition, mobile signature analysis, cooperative distributed peer-to-peer ad hoc networking and processing, local cloud/fog computing and grid/mesh computing, dew computing, mobile edge computing, cloudlet, distributed data storage and retrieval, remote cloud services, augmented reality and the like. It is understood in advance that although this specification includes description of cloud computing, implementation of the teachings recited herein are not limited to a cloud computing environment. Rather, embodiments of the present invention are capable of being implemented in conjunction with any other types of computing environment now known or later developed.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for providing an on-demand distributed computing cluster, the system comprising:
(i) a memory for storing a set of software instructions, and
(ii) one or more processors configured to execute the set of software instructions to:
(a) track one or more computing environments at one or more time points by a version-controlled file system;
(b) automatically provision an on-demand distributed computing cluster in response to a user launching a workspace or a processing job;
(c) reproduce one or more components of a tracked environment from the one or more computing environments tracked by the version-controlled file system for an execution to be run on the provisioned on-demand distributed computing cluster; and
(c) receive, via a graphical user interface (GUI), a single user input indicative of a synch instruction, wherein the single user input triggers a synchronization of the one or more reproduced components across a plurality of worker nodes in the on-demand distributed computing cluster prior to initiating the execution.

2. The system of claim 1, wherein the distributed computing cluster is a Message Passing Interface (MPI) cluster without a scheduling node.

3. The system of claim 1, wherein the GUI allows the user to interact with the one or more components during the execution running on the on-demand distributed computing cluster.

4. The system of claim 1, wherein the one or more components comprise data and codes.

5. The system of claim 4, wherein the synchronization comprises updating the data and codes on the plurality of worker nodes according to a change of the data and codes tracked by the version-controlled file system.

6. The system of claim 1, wherein the single user input includes a click on a graphical element displayed on the GUI.

7. The system of claim 1, wherein the GUI is configured to display an indicator indicating a readiness status of the on-demand distributed computing cluster.

8. The system of claim 7, wherein an execution run command is received via the GUI when the status of the demand distributed computing cluster is not ready.

9. The system of claim 7, wherein the readiness status is determined by a distributed computer operator based on a number of available worker nodes.

10. The system of claim 1, wherein the GUI is configured to display information related to a last synchronization.

11. The system of claim 1, wherein the on-demand distributed computing cluster is deprovisioned after the workplace or the processing job is shut down.

12. A computer-implemented method for providing an on-demand distributed computing cluster, the method comprising:
(a) tracking one or more computing environments at one or more time points by a version controlled file system;
(b) automatically provision an on-demand distributed computing cluster in response to a user launching a workspace or a processing job;
(d) reproducing one or more components of a tracked environment from the one or more computing environments tracked by the version-controlled file system for an execution to be run on the provisioned on-demand distributed computing cluster; and
(c) receiving, via a graphical user interface (GUI), a single user input indicative of a synch instruction, wherein the single user input triggers a synchronization of the one or more reproduced components across a plurality of worker nodes in the on-demand distributed computing cluster prior to initiating the execution.

13. The computer-implemented method of claim 12, wherein the distributed computing cluster is a Message Passing Interface (MPI) cluster without a scheduling node.

14. The computer-implemented method of claim 12, wherein the GUI allows the user to interact with the one or more components during the execution running on the on-demand distributed computing cluster.

15. The computer-implemented method of claim 12, wherein the one or more components comprise data and codes and wherein the synchronization comprises updating the data and codes on the plurality of worker nodes according to a change of the data and codes tracked by the version-controlled file system.

16. The computer-implemented method of claim 12, wherein the single user input includes a click on a graphical element displayed on the GUI.

17. The computer-implemented method of claim 12, wherein the GUI is configured to display an indicator indicating a readiness status of the on-demand distributed computing cluster.

18. The computer-implemented method of claim 17, wherein an execution run command is received via the GUI when the status of the demand distributed computing cluster is not ready.

19. The computer-implemented method of claim 17, wherein the readiness status is determined by a distributed computer operator based on a number of available worker nodes.

20. The computer-implemented method of claim 12, wherein the GUI is configured to display information related to a last synchronization.

\* \* \* \* \*